(12) United States Patent
Puhov et al.

(10) Patent No.: US 9,286,004 B1
(45) Date of Patent: Mar. 15, 2016

(54) MANAGING I/O OPERATIONS IN MULTI-CORE SYSTEMS

(71) Applicant: EMC Corporation, Hopkinton, MA (US)

(72) Inventors: Peter Puhov, Shrewsbury, MA (US); Robert P. Foley, Clinton, MA (US); Peter J. McCann, Mason, NH (US)

(73) Assignee: EMC Corporation, Hopkinton, MA (US)

( * ) Notice: Subject to any disclaimer, the term of this patent is extended or adjusted under 35 U.S.C. 154(b) by 162 days.

(21) Appl. No.: 14/230,227

(22) Filed: Mar. 31, 2014

(51) Int. Cl.
*G06F 12/00* (2006.01)
*G06F 3/06* (2006.01)

(52) U.S. Cl.
CPC .............. *G06F 3/0655* (2013.01); *G06F 3/061* (2013.01); *G06F 3/0671* (2013.01)

(58) Field of Classification Search
None
See application file for complete search history.

(56) References Cited

U.S. PATENT DOCUMENTS

| | | | | |
|---|---|---|---|---|
| 4,688,193 A | * | 8/1987 | Yamaoka | G05B 19/05 700/18 |
| 5,495,451 A | * | 2/1996 | Cho | G06F 5/065 365/189.02 |
| 5,995,442 A | * | 11/1999 | Toda | G11C 7/1018 365/230.01 |
| 2009/0177666 A1 | * | 7/2009 | Kaneda | G06F 17/30067 |
| 2011/0153951 A1 | * | 6/2011 | Strumpen | G06F 12/0811 711/135 |

* cited by examiner

*Primary Examiner* — Charles Rones
*Assistant Examiner* — Matthew Chrzanowski
(74) *Attorney, Agent, or Firm* — John T. Hurley; Jason A. Reyes; Krishnendu Gupta (57) ABSTRACT

A technique for managing I/O operations in data storage systems having one or more multi-core processors is provided. A first variable stored in shared memory is configured to simultaneously store a counter associated with a number of I/O operations outstanding and a gate bit value associated with a gate condition. I/O operations are tracked by incrementing the counter value when an I/O operation is received and decrementing the counter value when an I/O operation is processed. If a storage object is identified as requiring a state change, the gate bit is set to queue any subsequent I/O operations. Outstanding I/O operations are drained by processing I/Os until the counter reaches zero. Any necessary operations are performed during the state change condition. The gate bit is cleared and I/O processing resumes. Atomic increment, decrement, OR and AND instructions provide synchronization across the multiple cores.

20 Claims, 3 Drawing Sheets

MANAGING I/O OPERATIONS IN MULTI-CORE SYSTEMS

BACKGROUND

1. Technical Field

This application relates generally to managing I/O operations in multi-core computer systems.

2. Description of Related Art

Digital computer systems typically include processing subsystems and memory subsystems, the latter for storing data and sequences of instructions, the former for operating upon the data as directed by a sequence of instructions (such a sequence being known as a "program").

Advances in hardware design have resulted in "multiprocessor" systems and "distributed" systems, wherein a plurality of intelligent entities (CPU's, I/O channels, etc.) may operate simultaneously, often sharing some of the data in memory and cooperatively updating that data. Similarly, advances in software design have culminated in "multiprogram" or "multiprocess" systems, wherein a single intelligent hardware unit may host a plurality of programs, operating independently of each other, all of which may operate simultaneously, possibly sharing and cooperatively updating data.

One of the problems that had to be overcome to realize such configurations was the coordination of data sharing—for example, preventing two or more processes from attempting to update the same data at the same time. A typical scenario in which difficulty might arise might be: 1. A first process reads a location, and calculates based on what it read a new contents for that location, which it intends to store in that location; 2. Before the first process can write those results, a second process reads the same location, and calculates a new contents for that location, which it intends to store; 3. The first process stores the new contents it calculated; 4. The second process stores the new contents it calculated.

The result stored by the second process is probably incorrect, because it is based on obsolete data—data which the second process had no way of knowing was already being updated by the first process.

A solution to this problem has been to define an "atomic" or "indivisible" operation for performing such data modification, in which no intermediate results of the atomic operation are externally visible—when one process is performing such an operation, no other processes can access the data until the operation is completed.

The prior-art implementation of this solution has been to "lock" the entire memory for the duration of an atomic operation, meaning that any request by another process to use the memory had to be held pending until the atomic operation was completed. This has a deleterious effect on the efficiency of the system. A refinement to this basic solution is to lock something less than the entire portion of the memory, usually the physical "block" or "page" containing the location upon which the atomic operation is being performed. Since such a portion is typically several thousand locations or more, this results in pending a significant portion of the other processes contending for memory access and is thus not a complete solution to the problem.

SUMMARY OF THE INVENTION

A technique for managing I/O operations in data storage systems having one or more multi-core processors is provided. A first variable stored in shared memory is configured to simultaneously store a counter associated with a number of I/O operations outstanding and a gate bit value associated with a gate condition. I/O operations are tracked by incrementing the counter value when an I/O operation is received and decrementing the counter value when an I/O operation is processed. If a storage object is identified as requiring a state change, the gate bit is set to queue any subsequent I/O operations. Outstanding I/O operations are drained by processing I/Os until the counter reaches zero. Any necessary operations are performed during the state change condition. The gate bit is cleared and I/O processing resumes. Atomic increment, decrement, OR and AND instructions provide synchronization across the multiple cores.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
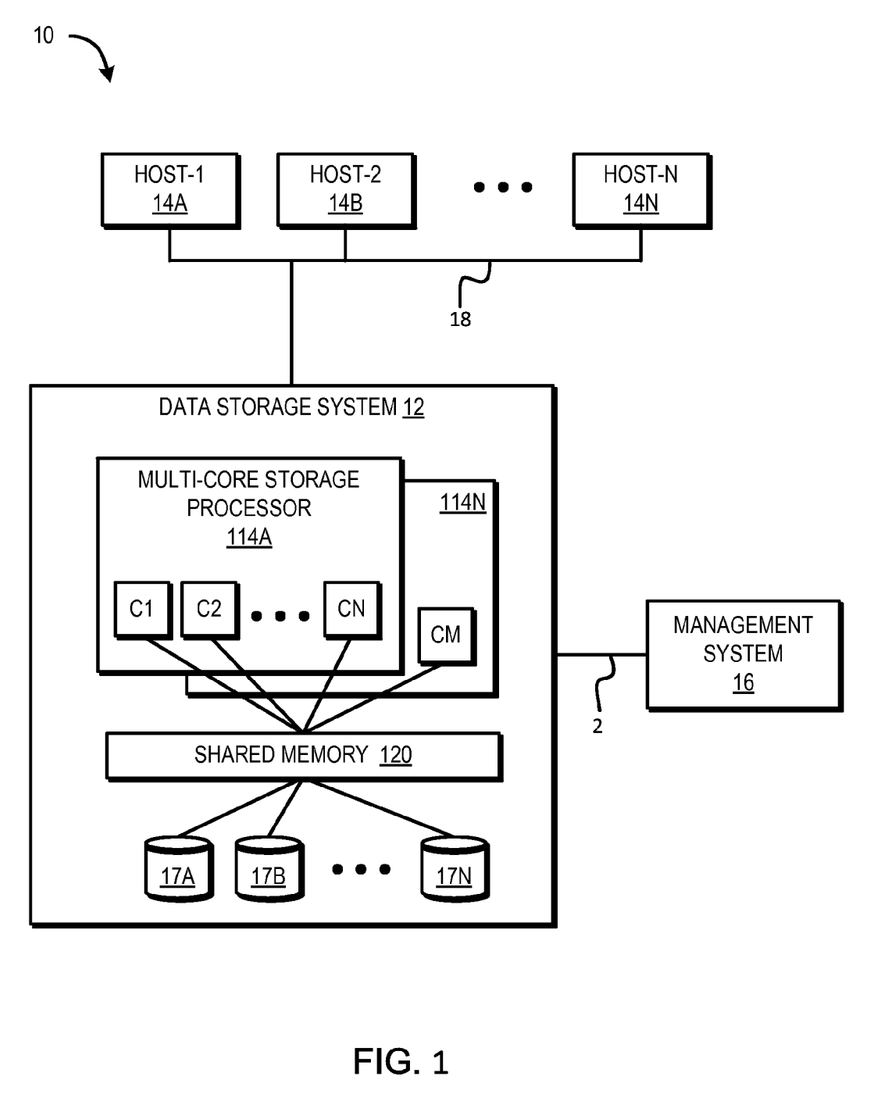
FIG. 1 is a schematic diagram illustrating an electronic environment in which the techniques described herein may be implemented.

FIG. 1 depicts an example embodiment of a system that may be used in connection with performing the techniques described herein. The system 10 includes one or more data storage systems 12 connected to server or host systems 14a-14n through communication medium 18. The system 10 also includes a management system 16 connected to one or more data storage systems 12 through communication medium 2. In this embodiment of the system 10, the management system 16, and the N servers or hosts 14a 14n may access the data storage systems 12, for example, in performing input/output (I/O) operations (also referred to herein as I/O or I/Os), data requests, and other operations. The communication medium 18 may be any one or more of a variety of networks or other type of communication connections as known to those skilled in the art. Each of the communication mediums 18 and 2 may be a network connection, bus, and/or other type of data link, such as a hardwire or other connections known in the art. For example, the communication medium 18 may be the Internet, an intranet, network or other wireless or other hardwired connection(s) by which the host systems 14a 14n may access and communicate with the data storage systems 12, and may also communicate with other components (not shown) that may be included in the system 10. In one embodiment, the communication medium 2 may be a LAN connection and the communication medium 18 may be an iSCSI, Fibre Channel, Serial Attached SCSI, or Fibre Channel over Ethernet connection.

Each of the host systems 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 2 by any one of variety of connections in accordance with the type of communication medium 2. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 2, a variety of different communication protocols may be used such as SCSI, Fibre Channel, iSCSI, and the like. Some or all of the connections by which the hosts, management system, and data storage system may be connected to their respective communication medium may pass through other communication devices, such as switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the data storage systems 12 may include one or more data storage systems such as one or more of the data storage systems, such as data storage arrays, offered by EMC Corporation of Hopkinton, Mass. Each of the data storage systems may include one or more data storage devices 17a-17n. Unless noted otherwise, data storage devices may be used interchangeably herein to refer to hard disk drive, solid state drives, and/or other known storage devices. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of storage devices 17a-17n. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

The data storage system may be a single unitary data storage system, such as single data storage array, including two storage processors or compute processing units. Techniques herein may be more generally use in connection with any one or more data storage system each including a different number of storage processors than as illustrated herein. The data storage system 12 may be a data storage array, such as a VNX® data storage array by EMC Corporation of Hopkinton, Mass., including a plurality of data storage devices 17a-17n and two or more storage processors 114A, 114B. The storage processors 114A, 114B include multi-core central processing units (CPU) C1-CM and memory and ports (not shown) for communicating with one or more physical or virtual hosts 14A-14N. (Unless indicated otherwise, processor and core may be used interchangeably.) The storage processor may be communicatively coupled via a communication medium such as storage processor bus (not shown). The storage processor units may be included in the data storage system 12 for processing requests and commands. In connection with performing techniques herein, an embodiment of the data storage system may include multiple storage processors including more than two storage processors as described. The VNX® data storage system mentioned above may include two or more multi-core storage processors 114A, 114B for performing processing in connection with servicing requests. Shared memory 120 may be provided for storing shared data that each storage processor 114A, 114B may access for the purposes of reading from and writing to data that needs to be commonly available to all processors/cores.

Additionally, the two or more multi-core processors 114A-B may be used in connection with failover processing when communicating with the management system 16. Client software on the management system 16 may be used in connection with performing data storage system management by issuing commands to the data storage system 12 and/or receiving responses from the data storage system 12 over connection 2. In one embodiment, the management system 16 may be a laptop or desktop computer system.

The multi-processor storage system 12 in which an embodiment of the invention may be implemented includes a plurality of processors 114A-114N that operates in parallel and competes for the various shared resources. The shared resources may include shared I/O storage devices 17A-17N and/or a shared memory 120. The system 12 may further includes a memory management unit (not shown), which controls the read/write access to the shared memory 120. The processors 114A-114N, the shared I/O devices 17A-17N and the memory management unit communicate over a system bus (not shown). The processors 114A-114N access the shared memory 210 via the memory management unit 200. A multi-tasking operating system coordinates the interaction between the various processors 114A-114N, and between the processors 114A-114N and the shared memory 120 via the memory management unit such that the processors operate cooperatively and in parallel. The operating system further coordinates the interaction between the various processors 114A-N, and the various shared I/O resources 17A-N. In theory, the performance of the multi-processor system is linearly related to the number of processors used in the system. For example, a sixteen-core processor system should perform sixteen fold over a uni-core processor system. However, in practice, due to various factors such as program task data structure, memory contention and synchronization, and I/O contention and so forth, the use of multiple-core processors may not achieve the expected improvement in system performance. Therefore, optimizing the various factors increases the system's performance closer to its ideal performance.

One limiting factor is I/O contention. Storage systems having one or more multi-core processors can process I/O operations directed to and from a particular RAID group in parallel. Thus, the execution time of an I/O operation directed to a RAID group can be reduced by dividing the I/O among multiple cores with each core processes its portion of the I/O in parallel. Such approaches can significantly improve overall system performance.

However, certain memory resources and/or operations need to ensure that only one core accessing the memory at a time. Conventional systems typically employ a locking mechanism to allow one core to lock the memory resource while it is processing its I/O so as to prevent other cores from accessing the same memory resource at the same time.

Spinlocks are an example of conventional locking mechanisms that ensure orderly access to a shared memory. For example, a spinlock may ensure that only one processor is accessing a segment of the memory at any given time. Each segment of the memory may have a respective spinlock associated with it and whenever a core requires access to a segment, it first tries to acquire the associated spinlock to determine whether it is locked or unlocked. A locked status of the spinlock indicates that another core is currently accessing that segment of the memory. Conversely, an unlocked status indicates that the segment is available for access. In other words, when a processor needs to access a memory segment, it tests the associated spinlock to determine whether another processor is currently accessing that segment. If not, the testing processor acquires and locks the spinlock to exclude other processors from access. The core then typically performs one or more operations on the data contained in the segment. In one example, a spinlock is a register whose content indicates whether it is locked or unlocked (e.g. "1" or "0"). The operating system in conjunction with the memory management unit and the spinlocks maintain coherency of the data processed by the plurality of processor's 114A-114N cores.

Depending on the design of the multi-core processor, the length of time a core accesses a segment varies from operation to operation. For example, if the processor is performing a simple read operation, the time that it keeps the spinlock locked may be brief. In another instance, if the processor is performing a complicated modification of the data, the time it keeps the spinlock locked may be lengthy. Once the processor has completed its access, it releases the spinlock for other processors to access the segment.

Processor cores accessing a particular memory segment at the same time compete for the acquisition of the spinlock. Processors that fail to gain access wait and 'spin' before re-attempting access. This is generally performed by causing the processor to enter into a finite loop. Generally, a waiting processor continuously tests the spinlock until it gains access. One problem associated with the continuous testing by a waiting processor is that severe memory contention occurs as the number of processors competing for memory access increases. This in turn degrades overall system performance.

Using a shared memory as an example, there may be substantial memory contention in the various segments of the memory as the processors compete for spinlock acquisition. A processor unable to acquire the spinlock continuously tests the spinlock until it is acquired. However, as the number of processors competing for the spinlock increases, severe memory contention arises which, in turn, degrades overall system performance. Furthermore, as mentioned above, certain spinlock acquisitions are held briefly while others are held for lengthy periods of time. Thus, continuous testing of the spinlock when its holding period is lengthy merely increases memory contention, hurting overall system performance. In systems where there are one or two processors, spinlock may be tolerable. However, storage systems are currently shipping with 16 CPU cores, and 32 core systems are soon to follow. Such a large number of cores results in significant contention and other inefficiencies, thereby by reducing systems performance. Furthermore, the problem may worsen in a non-linear fashion in that the contention issue increases at a faster rate as the number of cores increases, for example increasing the number of cores by 16 results in a more than 16 fold increase in contention related spinning. Thus, employing conventional spinlock mechanisms inhibits storage system from realizing the potential performance improvement afforded with multi-core processors.

There are a number of use cases where data cannot be changed outside the context of a particular process such as RAID degradation, performing snapshot copies, minoring, and the like. For example, when a drive in a particular RAID group fails, the RAID group can continue processing I/O operations but will need to be switched to a degraded mode. However, before the RAID group can be switched to a degraded mode, two things need to happen: any subsequent I/O operations directed to the RAID group need to be queued and any outstanding I/O operations need to be drained.

Queuing any new I/O operations involves knowing when stop accepting new I/Os so that any subsequent I/Os directed to the object or RAID group get queued or "gated." A gate variable may be used to indicate whether I/Os should be gated or allowed to proceed for processing. The gate variable may be used as a signal to the processor to indicate that I/Os need to be gated therein.

In addition, any outstanding I/Os need to be processed or "drained." Determining the number of outstanding I/Os is necessary to know when the object has been drained. A counter variable may be used and when an I/O is received the counter is incremented and when an I/O has been processed the counter gets decremented. Thus, the counter variable can be read to determine how many outstanding I/Os need to be processed or "drained." When the counter reaches zero, all the outstanding I/Os have been drained. In this way, the I/O path can be directed to stop/queue new I/Os and can keep track of the number of outstanding I/Os for every object.

The current techniques described herein provide a mechanism to perform these operations using a single atomic instruction. Such techniques can perform in a single operation, what conventional methods require at least three operations to perform while significantly reducing contention and improving system performance. For example, conventional methods require three operations to increment the counter: read, modify, write. By contrast, current techniques employ a single atomic instruction to achieve similar functionality. Furthermore, advantageously, atomic instructions are guaranteed by processor logic to be performed sequentially across all processor cores, thus, shared memory remains synchronized across all the processor cores.

Figure 2A:
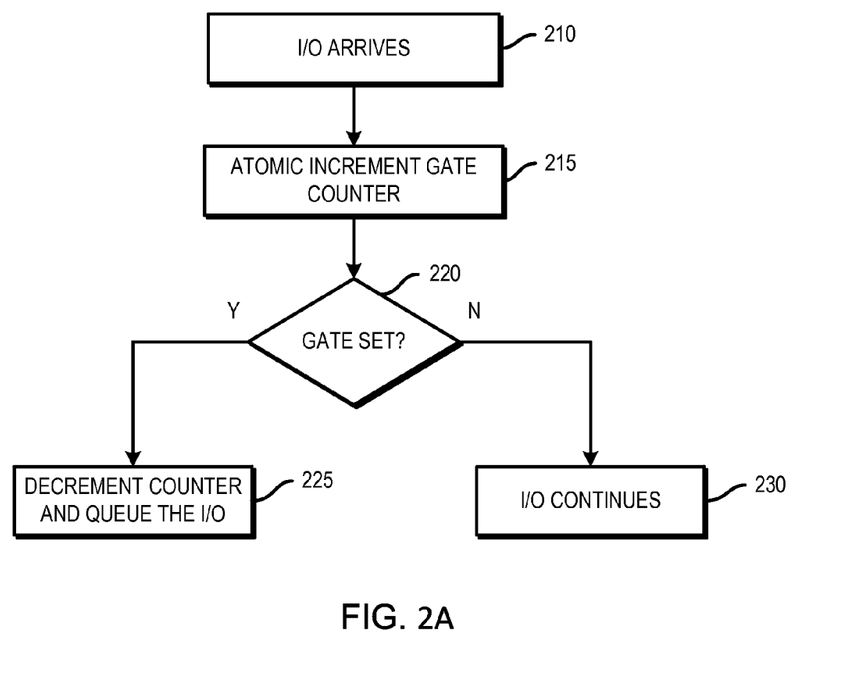
FIG. 2A is a flowchart illustrating example embodiments may utilize the techniques described herein.

FIG. 2A is a flow diagram depicting an example method for use in implementing techniques described herein to provide a multi-core gate counter. While various methods disclosed herein are shown in relation to a flowchart or flowcharts, it should be noted that any ordering of method steps implied by such flowcharts or the description thereof is not to be construed as limiting the method to performing the steps, or sub-steps within or among the steps, in that order. Rather, the various steps of each of the methods disclosed herein can be performed in any of a variety of sequences. In addition, as the illustrated flowcharts are merely example embodiments, various other methods that include additional steps or include fewer steps than illustrated are also within the scope of the present invention.

As shown, the method can begin at step 210. The method can be configured to run automatically as part of system operating or application software or the like. Alternatively, or in addition, the method may be initiated manually by a user, for example, by clicking on a button or other object in a graphical user interface (GUI) associated with a management system or by entering a command in a command-line-interface. Execution of the method can also be based on various user-specified parameters. For example, a user can specify a timeout value, execution frequency, or other configurable parameter.

At step 210, I/Os arrive for processing. At step 215, the method increments a counter value to indicate that an I/O is in-flight and needs to be processed. An atomic_increment operation is executed, where in a single operation, a pointer to a counter variable is passed as part of the instruction, the counter variable gets incremented, and the value that was stored in the counter variable prior to the increment operation gets returned. Thus, in a single instruction, a read, modify, write operation is performed. In addition, because it is an atomic instruction, it is interlocked by the processor hardware ensuring synchronization with all the other processor cores.

Figure 2B:
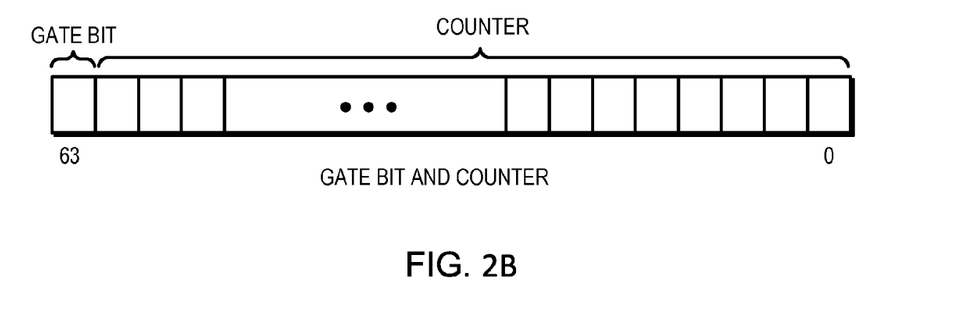
FIG. 2B depicts a variable configured to store multiple different values simultaneously.

At step 220, the gate bit is checked to see if is set by examining the value that gets returned as a result of the atomic increment instruction (i.e., the counter value prior to being incremented). As shown in FIG. 2B, a unique variable is created that combines the counter value and the gate bit in a single 64-bit variable is implemented, where the lower 63 bits may be reserved for the counter value in the 64th bit or MSB is reserved for the gate bit.

Advantageously, since the counter value and the gate bit are stored in the same memory location the processor logic guarantees that the gate bit in the counter are atomically synchronized. It should be noted that the MSB has been selected for convenience, and the gate bit may reside in another location. As a result, the counter value and the gate bit can be determined in a single atomic instruction. If the gate bit was set, this indicates that I/Os have been queued or stopped. In this case, the method proceeds to step 225 where in atomic decrement instruction is executed and the I/O gets queued. The decrement operation is necessary as the nature of an atomic instruction performed both the counter increment and gate bit examination in one operation. If the method determines after the atomic operation that the gate bit was set, the counter value is decremented to account for this. If at step 220 it is determined that the gate bit is not set, the method proceeds to step 230 where I/Os continue to be processed.

The gate bit can be set or cleared using an atomic_OR operation. For example, the gate bit can be set by executing an atomic_OR operation by passing a value where the MSB set to one and all the other bits set to zero, or can be cleared by passing a value where the MSB is set to zero and all the other bits set to zero. When the gate bit has been set, the I/Os will be queued such that no further I/Os will be allowed to get through the I/O path for processing.

Thus, using atomic OR, increment, or decrement instructions, operating modes may be context sensitive in that I/Os can be processed in the usual manner, as well as identifying a situation where an underlying object needs to be placed in a mode where subsequent I/Os are gated/queued, outstanding I/Os are drained, and then any necessary operations may be performed. Once the necessary operations have been performed, the gate bit can be cleared and the queued I/Os and subsequent I/Os can be processed in the normal manner.

In the majority of the cases, the gate bit will not be set. In this case, implementing atomic operations to increment/decrement the counter value (which needs to be done anyway) can be performed in the fastest possible manner. Furthermore, in the case when the gate bit is set, a single atomic operation is significantly faster than conventional spinlock methods that require multiple instructions and additional time to maintain a lock on a memory location. Accordingly, the current techniques described herein offer significant performance improvements in both the standard processing mode as well modes requiring the gate/drain mode.

Figure 3:
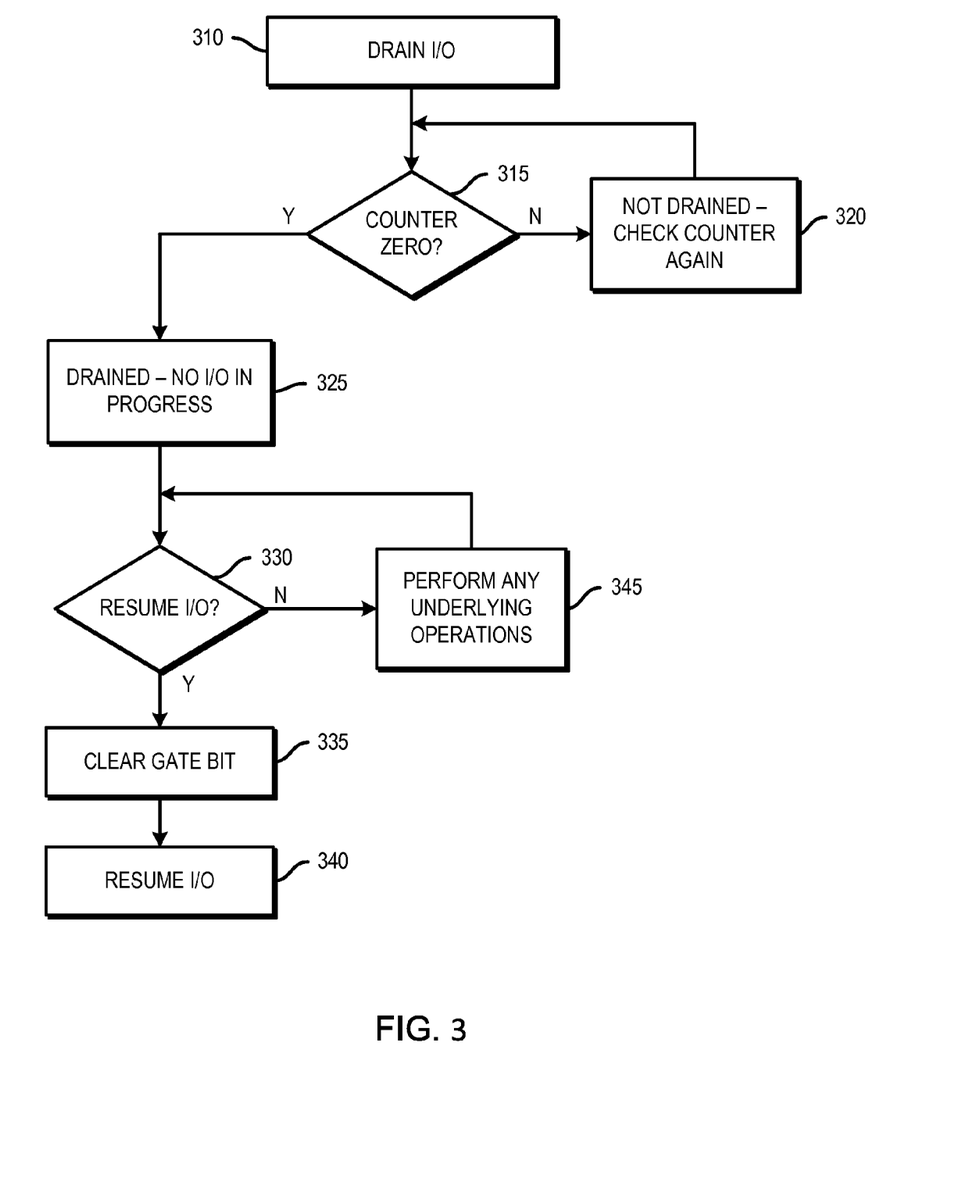
FIG. 3 is a flowchart illustrating example embodiments may utilize the techniques described herein.

FIG. 3 is a flow diagram depicting in additional detail an example embodiment implementing techniques associated with the drain and related operations. At step 310, it has been determined that a storage object, such as a RAID group, needs to be placed in a mode that requires I/Os be gated and in-flight data be processed. The method proceeds to step 315, where a determination is made to see if the counter value is zero. If the counter is not zero, this indicates that there are still I/Os that need to be processed as which point the method loops back to step 315 and repeats the procedure until the counter value reaches zero. When the counter value reaches zero, the method proceeds to step 325 at which point a drained state has been reached.

At step 330, the method determines whether or not to resume I/O, and if not, proceeds to step 345. Any underlying operations that required I/Os be stopped and drained may be performed at this point. Examples include the aforementioned scenario where a drive in a RAID group has failed and the RAID group needs to be transitioned to a degraded mode. Before the RAID group is placed in a degraded mode, all subsequent I/Os need to be gated and all outstanding I/Os need to be drained. After performing the underlying operation, the method loops back to step 330 to determine if I/O should be resumed. The method may loop between steps 330 and 335 until all desired operations have been performed. Once a determination has been made to resume processing subsequent I/Os, the method proceeds to step 335 where the gate bit gets cleared. This may be achieved using, for example, an atomic OR operation where a 64 bit word containing all zeros is passed in. The method proceeds to step 340 where normal operation is resumed and I/Os are processed in the usual manner.

Accordingly, the techniques described herein provide a method, system, and computer program product for managing I/O operations in data storage systems having one or more multi-core processors. A first variable may be configured to simultaneously store a first value and a second value, the first value storing a counter associated with a number of I/O operations directed to a storage object that remain outstanding, and the second value storing a gate bit associated with an open or closed gate condition, wherein the first variable is stored in a shared memory location accessible by two or more cores of the one or more multi-core processors. I/O operations directed to a storage object may be tracked and includes incrementing the first value of the first variable when an I/O operation is received and decrementing the first value of the first variable when an I/O operation is processed. The storage object is monitored to determine if an operation that requires the storage object to change state needs to be performed. The second value is set such that the bit location associated with the gate bit of the first variable is set to a value indicative of a gate closed condition so that subsequent I/O operations are queued/gated in a respective core (i.e., the core processing the I/O operation) of the one or more multi-core processors.

The technique may further include draining outstanding I/O operations by continuing to process I/O operations until the first value of the first variable reaches zero. There are situation where a storage object needs to be placed in a particular mode or state where, for example, existing I/Os are drained and subsequent I/Os are queued as may be the case when a RAID group is degraded. Such operations may be performed at this point. When complete and the storage object is to be returned to a 'normal' state, the second value may be cleared such that the bit location associated with the gate bit of the first variable is set to a value indicative of a gate open condition so that subsequent I/O are no longer queued.

Alternative example embodiment may include evaluating the gate bit of a return value returned responsive to the atomic increment operation. Alternatively, or in addition, the techniques may determine that the gate bit is set to a value indicative of a gate closed condition and initiate an atomic decrement operation on the first variable. A first variable may be maintained for each of multiple storage objects. The first variable may be a 32-bit word, a 64-bit word or other appropriate bit length variable. The word's most significant bit may be used to store the first value and the remaining bits are used to store the second value. Similar alternative arrangements may be similarly used with the requirement that the first value and the second value be simultaneously stored therein.

Example embodiments may further include incrementing the first value by initiating an atomic increment operation using the first variable and storing a returned value in a second variable and decrementing may further include initiating an atomic decrement operation using the first variable and storing a returned value in a second variable. Alternatively, or in addition, setting the second value may include initiating an atomic OR operation using the first variable, wherein the most significant bit is set to a value indicative of a closed gate condition and the remaining bits are set to zero. The reverse of the settings may be used in systems employing negative logic. Similarly, clearing the second value may include initiating an atomic OR operation using the first variable, wherein the most significant bit is set to a value indicative of open gate value and the remaining bits are set to zero.

It should again be emphasized that the technique implementations described above are provided by way of illustration, and should not be construed as limiting the present invention to any specific embodiment or group of embodiments. For example, the invention can be implemented in other types of systems, using different arrangements of processing devices and processing operations. Also, message formats and communication protocols utilized may be varied in alternative embodiments. Moreover, various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

Furthermore, as will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

The techniques described herein may take the form of a computer program product on a computer-usable storage medium having computer-usable program code embodied in the medium. Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), Flash memory, an optical fiber, a portable compact disc read-only memory (CD-ROM), an optical storage device, digital versatile disc ROM (DVD-ROM) a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The block diagrams and flowchart in the FIGs illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for managing I/O operations in data storage systems having one or more multi-core processors, the method comprising:
    maintaining a first variable configured to simultaneously store a first value and a second value, the first value storing a counter associated with a number of I/O operations directed to a storage object that remain outstanding, and the second value storing a gate bit associated with an open or closed gate condition, wherein the first variable is stored in a shared memory location accessible by two or more cores of the one or more multi-core processors;
    tracking I/O operations directed to a storage object, wherein tracking includes incrementing the first value of the first variable when an I/O operation is received and decrementing the first value of the first variable when an I/O operation is processed;
    determining that the storage object needs to perform an operation that requires the storage object to change state;
    setting the second value, wherein the bit location associated with the gate bit of the first variable is set to a value indicative of a gate closed condition such that subsequent I/O operations are queued in a respective core of the one or more multi-core processors;
    draining outstanding I/O operations by continuing to process I/O operations until the first value of the first variable reaches zero;
    performing operations that required the storage object to change state; and
    clearing the gate bit, wherein the bit location associated with the gate bit of the first variable is set to a value indicative of a gate open condition such that subsequent I/O are no longer queued.

2. The method of claim 1, further including evaluating the gate bit of a return value returned responsive to the atomic increment operation.

3. The method of claim 1, further including:
    evaluating the gate bit of a return value returned responsive to the atomic increment operation;
    determining that the gate bit is set to a value indicative of a gate closed condition; and
    initiating an atomic decrement operation on the first variable.

4. The method of claim 1, further including maintaining a first variable for each of multiple storage objects.

5. The method of claim 1, wherein the first variable is a 64 bit word, wherein most significant bit is used to store the first value and the remaining bits are used to store the second value.

6. The method of claim 1, wherein incrementing the first value includes initiating an atomic increment operation using the first variable and storing a returned value in a second variable.

7. The method of claim 1, wherein decrementing the first value includes initiating an atomic decrement operation using the first variable and storing a returned value in a second variable.

8. The method of claim 1, wherein setting the second value includes initiating an atomic OR operation using the first variable, wherein the most significant bit is set to a value indicative of a closed gate condition and the remaining bits are set to zero.

9. The method of claim 1, wherein clearing the second value includes initiating an atomic OR operation using the first variable, wherein the most significant bit is set to a value indicative of open gate value and the remaining bits are set to zero.

10. A system for managing I/O operations in data storage systems having one or more multi-core processors, the system configured to:
    maintain a first variable configured to simultaneously store a first value and a second value, the first value storing a counter associated with a number of I/O operations directed to a storage object that remain outstanding, and the second value storing a gate bit associated with an open or closed gate condition, wherein the first variable is stored in a shared memory location accessible by two or more cores of the one or more multi-core processors;

track I/O operations directed to a storage object, wherein tracking includes incrementing the first value of the first variable when an I/O operation is received and decrementing the first value of the first variable when an I/O operation is processed;

determine that the storage object needs to perform an operation that requires the storage object to change state;

set the second value, wherein the bit location associated with the gate bit of the first variable is set to a value indicative of a gate closed condition such that subsequent I/O operations are queued in a respective core of the one or more multi-core processors;

drain outstanding I/O operations by continuing to process I/O operations until the first value of the first variable reaches zero;

perform operations that required the storage object to change state; and clear the gate bit, wherein the bit location associated with the gate bit of the first variable is set to a value indicative of a gate open condition such that subsequent I/O are no longer queued.

11. The system of claim 10, further including evaluate the gate bit of a return value returned responsive to the atomic increment operation.

12. The system of claim 10, further including:
evaluate the gate bit of a return value returned responsive to the atomic increment operation;
determine that the gate bit is set to a value indicative of a gate closed condition; and
initiate an atomic decrement operation on the first variable.

13. The system of claim 10, further including maintaining a first variable for each of multiple storage objects.

14. The system of claim 10, wherein the first variable is a 64 bit word and the most significant bit is used to store the first value and the remaining bits are used to store the second value.

15. The system of claim 10, wherein increment the first value includes initiating an atomic increment operation using the first variable and storing a returned value in a second variable.

16. The system of claim 10, wherein decrement the first value includes initiating an atomic decrement operation using the first variable and storing a returned value in a second variable.

17. The system of claim 10, wherein set the second value includes initiating an atomic OR operation using the first variable, wherein the most significant bit is set to a value indicative of a closed gate condition and the remaining bits are set to zero.

18. The system of claim 10, wherein clear the second value includes initiating an atomic OR operation using the first variable, wherein the most significant bit is set to a value indicative of open gate value and the remaining bits are set to zero.

19. A computer program product including non-transitory computer readable storage medium having stored thereon computer executable instructions that when executed by the multi-core processor of a computer perform steps comprising:

maintaining a first variable configured to simultaneously store a first value and a second value, the first value storing a counter associated with a number of I/O operations directed to a storage object that remain outstanding, and the second value storing a gate bit associated with an open or closed gate condition, wherein the first variable is stored in a shared memory location accessible by two or more cores of the one or more multi-core processors;

tracking I/O operations directed to a storage object, wherein tracking includes incrementing the first value of the first variable when an I/O operation is received and decrementing the first value of the first variable when an I/O operation is processed;

determining that the storage object needs to perform an operation that requires the storage object to change state;

setting the second value, wherein the bit location associated with the gate bit of the first variable is set to a value indicative of a gate closed condition such that subsequent I/O operations are queued in a respective core of the one or more multi-core processors;

draining outstanding I/O operations by continuing to process I/O operations until the first value of the first variable reaches zero;

performing operations that required the storage object to change state; and clearing the gate, wherein the bit location associated with the gate bit of the first variable is set to a value indicative of a gate open condition such that subsequent I/O are no longer queued.

20. The computer program product of claim 19, further comprising:
evaluating the gate bit of a return value returned responsive to the atomic increment operation;
determining that the gate bit is set to a value indicative of a gate closed condition; and
initiating an atomic decrement operation on the first variable.

* * * * *